United States Patent
Sommargren

[11] Patent Number: 6,014,264
[45] Date of Patent: Jan. 11, 2000

[54] EMBEDDED FIDUCIALS IN OPTICAL SURFACES

[75] Inventor: Gary E. Sommargren, Santa Cruz, Calif.

[73] Assignee: The Regents of the University of California, Oakland, Calif.

[21] Appl. No.: 09/173,769

[22] Filed: Oct. 16, 1998

[51] Int. Cl.⁷ ................................ G02B 3/00; H04N 1/00
[52] U.S. Cl. ................. 359/642; 356/401; 430/5; 430/22; 430/321; 430/322
[58] Field of Search .............. 359/642; 356/401, 356/399; 355/53; 430/5, 22, 321, 322

[56] References Cited

U.S. PATENT DOCUMENTS 5,062,701  11/1991  Drazba .................... 351/160

*Primary Examiner*—Georgia Epps
*Assistant Examiner*—Michael A Lucas
*Attorney, Agent, or Firm*—L. E. Carnahan; Daryl S. Grzybicki

[57] ABSTRACT

Embedded fiducials are provided in optical surfaces and a method for embedding the fiducials. Fiducials, or marks on a surface, are important for optical fabrication and alignment, particularly when individual optical elements are aspheres. Fiducials are used during the course of the polishing process to connect interferometric data, and the equation describing the asphere, to physical points on the optic. By embedding fiducials below the surface of the optic and slightly outside the clear aperture of the optic, the fiducials are not removed by polishing, do not interfere with the polishing process, and do not affect the performance of the finished optic.

21 Claims, 1 Drawing Sheet

EMBEDDED FIDUCIALS IN OPTICAL SURFACES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the fabrication of optical elements, particularly to forming fiducials on spherical and aspherical optical elements to assist in fabrication and alignment, and more particularly to embedding fiducials below (3–10 $\mu$m) the surface of the optical element and outside the clear aperture thereof, and to a method for embedding the fiducials.

In recent years substantial research and development have been directed to various types of imaging system, particularly in the fabrication and alignment of complex optical components in imaging systems such as the extreme ultraviolet (EUV) lithography system. Fiducials, marks that are put on an optical surface and referenced to a coordinate system, are important for optical fabrication and alignment, particularly when individual optical elements are aspheres. It is desirable to put fiducials on an optical surface at the start of the fabrication process. This is particularly important in the fabrication of aspheres where the equation describing the asphere departure must be located very accurately on the surface of the optic. This location is accomplished with interferometry by recording fiducials along with the interference pattern. The fiducials are then used to calculate true spatial coordinates when they are imaged onto a charge coupled diode (CCD) camera along with the interference pattern. Additionally, fiducials are used to determine the location of optical axis and clear aperture on the optical element.

When fiducials are placed on optics, they are usually placed on the back or edge, not directly on the optical surface. Placing them on the optical surface has the advantage of being able to view and record them simultaneously with the interference pattern and use them during the polishing process to attain the proper surface figure (or shape) at a particular location on the optical surface as measured interferometrically. This is particularly important for the fabrication and polishing of aspheric figures. However, placing fiducials on the optical surface before the polishing process is completed presents two problems: 1) the fiducials will be polished off during fabrication; and 2) the fiducials will interfere with the polishing process by generating particulates that can scratch the surface of the optical element.

This problem has been resolved by the present invention, whereby the fiducials are embedded slightly below (3–10 $\mu$m) the surface of the optic and outside the clear aperture of the optic. This is accomplished by a lithographic process. Any subsequent polishing of the optical surface does not disturb the fiducials; they become a permanent marking on the optical surface. The embedding process is carried out such that it eliminates an edge around the fiducials which can chip, causing sleeks and scratches on the surface of the optic.

SUMMARY OF THE INVENTION

It is an object of the present invention to provide embedded fiducials in optical surfaces.

A further object of the invention is to aid in the fabrication and alignment of aspherical optical elements by embedding fiducials near the surface of the optical element.

A further object of the invention is to provide a method for embedding fiducials in optical surfaces.

Another object of the invention is to provide an optic element with fiducials embedded below the surface of the element and outside the clear aperture of the element.

Another object of the invention is to provide a method of embedding fiducials in optical surfaces which will aid in the fabrication and alignment of complex, aspherical optical imaging systems.

Another object of the invention is to provide a method for embedding fiducials beneath the surface of an optical element using lithographic processing which does not adversely affect the polishing of the optical element surface.

Other objects and advantages of the present invention will become apparent from the following description and accompanying drawings. Basically, the invention involved fiducials embedded below the surface of optical elements, and to a method for embedding the fiducials. Since fiducials are important for optical fabrication and alignment, particularly when individual optical elements are aspheres, the present invention enables fiducials to be embedded below the surface of the optical element so as not to interfere with fabrication of the element and polishing of the surface of the element. The fiducials are embedded both below (3–10 $\mu$m) the surface of the optical element and slightly outside the clear aperture of the element. Thus, the embedded fiducials are not removed by polishing, do not interfere with the polishing process, and do not affect the performance of the finished optic. The method for embedding the fiducials involves lithographic processing using conventional materials and procedures.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention is directed to embedded fiducials in optical surfaces, and to a method for embedding the fiducials. Fiducials are important for optical fabrication and alignment, particularly when individual optical elements or components are aspheres. Fiducials are used during the course of the polishing process to connect interferometric data, and the equation describing the sphere, to physical points on the optic.

As pointed out above, when fiducials are placed on optics, they are usually placed on the back or edge, not directly on the optical surface. Placing fiducials on the optical surface has the advantage of being able to use them during to polishing process to attain the proper surface figure or shape at a particular location on the optical surface as measured interferometrically. However, as also pointed out above, the prior approaches to placing fiducials on the optical surface before the polishing process is completed presents two problems; namely, the fiducials will be polished off during the surface polishing process, and they interfere with the polishing process. The present invention provides a solution to each of these problems by embedding the fiducials below the surface of the optic, a distance of 3–10 μm, for example, and are embedded such that they do not interfere with the polishing process or are removed by the polishing process.

Figure 1:
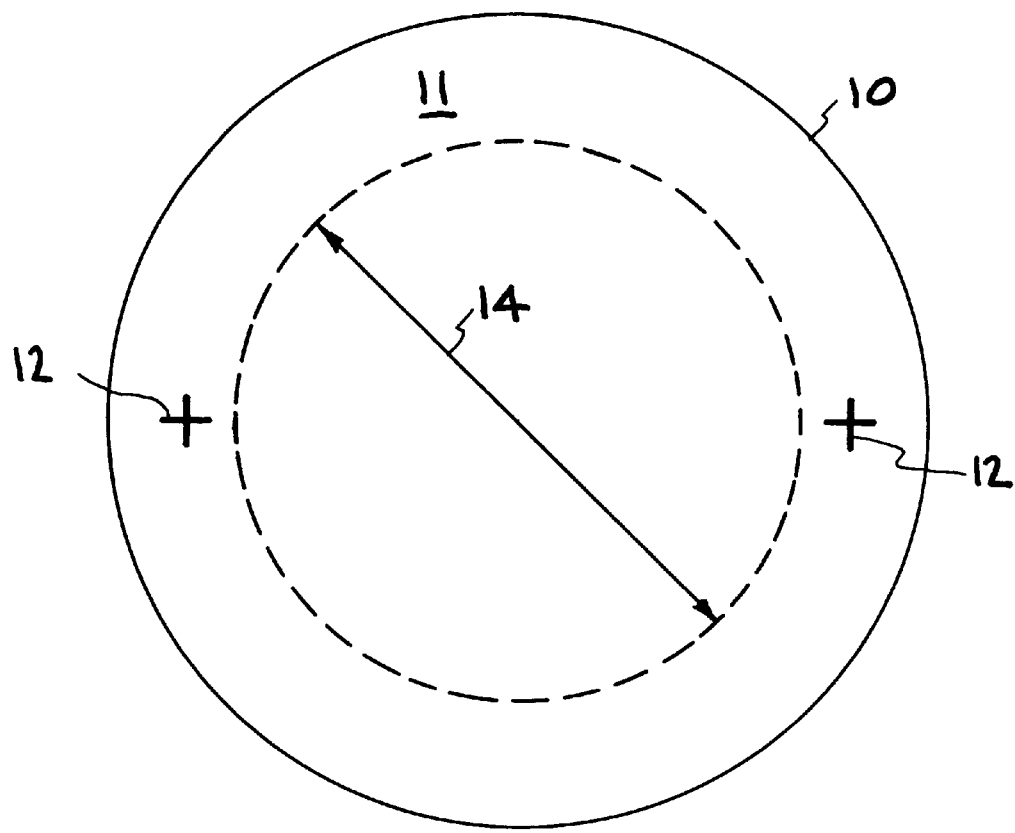
FIG. 1 is a top view of an spherical optical component with embedded fiducials in accordance with the present invention.
Figure 2:
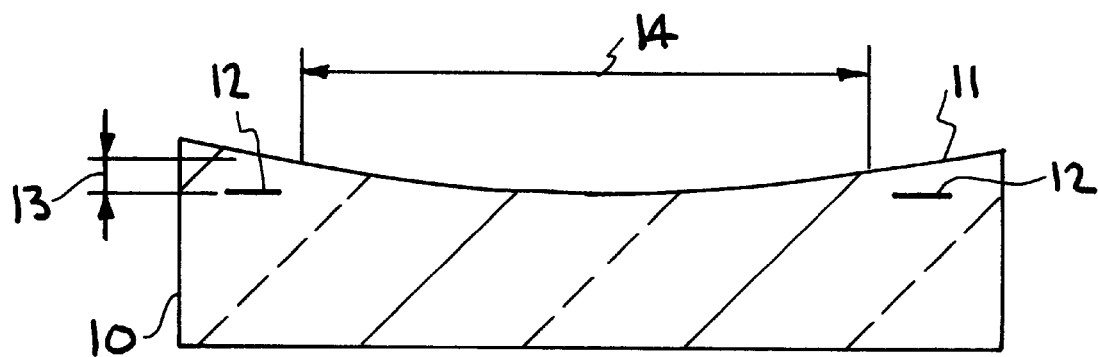
FIG. 2 is a cross-sectional view of the spherical optical component of FIG. 1.

Referring now to the drawings, FIGS. 1 and 2 illustrate an optical element or component 10 having an optical surface 11 with a plurality of fiducials 12 embedded therein having known spatial separations. As shown in FIG. 2, the fiducials 12 are embedded below the optical surface 11 a distance of 3–10 μm, as indicated by arrow 13. Optical surface 11 may be flat, concave or convex. Thus, polishing of the optical surface 11 will not remove the fiducials 12. The fiducials 12 are embedded by the following lithographic process whereby they do not interfere with the polishing process of optical surface 11. The fiducials 12 are embedded slightly below the surface 11 and outside clear aperture 14 of the optical component or element 10 utilizing, for example, the following operational sequence.

1. Clean the optical surface, such as by ultrasonic agitation in acetone, water, detergent, water, and then methyl alcohol (5 minutes each, sequentially).

2. Coat the optical surface with a positive photoresist, such as by vapor prime with HMDS as an adhesion promotor, then spin on AZ1518 photoresist at 2000 rpm.

3. Expose the photoresist to an image of the mask containing the fiducial or fiducials, such as by contact printing and using 405 nm UV at an exposure level of 200 mj/cm$^2$.

4. Develop the photoresist to uncover the optical surface below the fiducial(s) image, such as by a one minute soak in photoresist developer.

5. Etch the exposed optical surface with a method appropriate to the particular glass substrate (optical component) being used (the etch depth should be sufficiently deep so that subsequent polishing will not penetrate as deep as the etch—a typical etch depth is between 3 to 10 μm). For example, with a substrate composed of zerodur, the eching operation would be carried out as follows: one minute etch in hydrofluoric acid/hydrochloric acid/water, mixed 2/1/3 by volume.

6. Deposit a reflective coating (e.g., chromium, aluminum or gold) over the entire surface—this will coat the bottom of the etched region(s) as well as the remaining photoresist. For example, using chromium as the reflective coating, a thickness of 500 Å to 1000 Å is deposited by electron beam evaporation.

7. Use of lift-off technique to remove the remaining photoresist, such as by soaking the component in acetone.

8. Deposit a transparent compatible material to fill the etched void)s) and bring it up to, or slightly above, the surface of the substrate that defines the mirror. For example, using silicon dioxide, the etched void(s) is filled by plasma enhanced chemical vapor deposition.

Filling the etched void(s) serves two important functions during subsequent polishing these being: 1) it prevents polishing compound from become lodged in the void(s) and obscuring the fiducials, and 2) it eliminates the edge around the fiducial void(s) which can chip, causing sleeks or scratches on the surface of the optic.

This lithographic procedure results in reflective fiducials embedded below the surface of the optical component, as shown in FIG. 2. Thus, any subsequent polishing would not disturb the fiducials—they become a permanent marking of the optical component, and thus can be utilized, if desired, for aligning complex, aspherical optical imagine systems used, for example, for extreme ultraviolet (EUV) lithography.

It has thus been shown that the present invention provides embedded fiducials in optical surfaces and a method for embedding the fiducials, whereby the fiducials may be utilized in the fabrication and alignment of optical components, particularly spherical optical components. The embedded fiducials are outside the clear aperture of the optic surface and do not interfere with the polishing of the optical surface in which they are embedded, nor do they affect the performance of the finished optic in which they are embedded.

While a particular embodiment, materials, parameters, and operational sequence have been set forth to exemplify and teach the principles of the invention, such are not intended to be limiting. Modifications and changes may become apparent to those skilled in the art, and it is intended that the invention be limited only by the scope of the appended claims.

The invention claimed is:

1. An optical component having an optical surface with at least two fiducials embedded below said optical surface and outside the clear aperture of the optical surface.

2. The optical component of claim 1, wherein said at least two fiducials are located a distance of about 3 μm to about 10 μm below said optical surface.

3. The optical component of claim 1, wherein at least said optical surface is spheric or aspheric.

4. The optical component of claim 1, fabricated by a method comprising:

coating the optical surface with a photoresist;

exposing the photoresist to an image of the mask containing the at least two fiducials;

developing the photoresist to uncover the optical surface below the at least two fiducials image;

etching the exposed optical surface to a deep sufficiently deep such that subsequent polishing of the optical surface will not penetrate the at least one fiducial;

depositing a reflective coating over at least the etched region in the optical surface;

removing the photoresist and thereby lifting off the unwanted reflective coating;

depositing a transparent material to at least fill the etched voids in the optical surface; and continue with a polishing operation.

5. The optical component of claim 4, wherein the method of fabrication additionally includes, etching the optical surface to a depth of about 3–10 μm.

6. The optical component of claim 4, wherein the reflective coating is selected from the group consisting of chromium, aluminum, and gold.

7. The optical component of claim 4, wherein the transparent material deposited to at least fill the etched void is selected from the group consisting of silicon dioxide and spin-on glass.

8. The optical component of claim 4, additionally including depositing the material in the etched voids to bring the deposited material to above the optical surface.

9. The optical component of claim 4, wherein the etching of the exposed optical surface is carried out by an etching technique appropriate to the particular material being etched.

10. The optical component of claim 4, wherein the fabrication method additionally includes cleaning the optical surface prior to coating with the positive photoresist.

11. The optical component of claim 4, wherein the fabrication method additionally includes depositing the reflective coating at least over the area containing the fiducials.

12. The optical component of claim 4, wherein the fabrication method involves using a lift-off technique to remove the remaining photoresist.

13. A lithographic method for producing at least two reflective fiducial embedded below the reflective surface of an optic and which will not be removed by polishing the surface of the optic or affect the performance of the reflective surface of the optic, comprising:

coating the optical surface with a positive photoresist;

exposing the photoresist to an image of a mask containing the at least two fiducials image;

developing the photoresist to undercover the optical surface below the fiducials image;

etching the exposed optical surface to form regions of a desired depth;

depositing a reflective coating at least over the etched regions;

removing the remaining photoresist; and depositing a transparent material to fill the etched region to at least the surface of the optic.

14. The method of claim 13, additionally including cleaning the optical surface prior to coating with the photoresist.

15. The method of claim 13, wherein the etching is carried out by a technique appropriate to the material of the optic.

16. The method of claim 13, wherein the etching is carried out to produce an etch depth sufficiently deep so that subsequent polishing of the optical surface will not penetrate as deep as the etch depth.

17. The method of claim 13, wherein the etching is carried out to produce an etch depth of between 3 to 10 $\mu$m.

18. The method of claim 13, wherein depositing the reflective coating is carried out by depositing reflective material selected from the group consisting of chromium, aluminum, and gold.

19. The method of claim 13, wherein removing the remaining photoresist is carried out by using a lift-off technique.

20. The method of claim 13, wherein the transparent material deposited to fill the etched regions is selected from the group consisting of silicon dioxide or spin-on glass.

21. The method of claim 13, wherein the material deposited to fill the etched regions is deposited to above the optical surface.

* * * * *